US012573721B2

(12) United States Patent (10) Patent No.: US 12,573,721 B2
Geshi et al. (45) Date of Patent: Mar. 10, 2026

(54) BATTERY MODULE

(71) Applicant: Panasonic Intellectual Property Management Co., Ltd., Osaka (JP)

(72) Inventors: Shinya Geshi, Osaka (JP); Shingo Kume, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 349 days.

(21) Appl. No.: 17/045,539

(22) PCT Filed: Mar. 27, 2019

(86) PCT No.: PCT/JP2019/013348
§ 371 (c)(1),
(2) Date: Oct. 6, 2020

(87) PCT Pub. No.: WO2019/194053
PCT Pub. Date: Oct. 10, 2019

(65) Prior Publication Data
US 2021/0159571 A1     May 27, 2021

(30) Foreign Application Priority Data

Apr. 6, 2018     (JP) ................................. 2018-074200
Apr. 6, 2018     (JP) ................................. 2018-074201

(51) Int. Cl.
*H01M 50/503*          (2021.01)
*H01M 10/04*           (2006.01)
(Continued)

(52) U.S. Cl.
CPC ..... *H01M 50/503* (2021.01); *H01M 10/0422* (2013.01); *H01M 10/0525* (2013.01);
(Continued)

(58) Field of Classification Search
CPC ............. H01M 50/503; H01M 50/107; H01M 50/152; H01M 50/184; H01M 50/186;
(Continued)

(56) References Cited

U.S. PATENT DOCUMENTS 6,596,434 B1      7/2003   Yoshinawa et al.
2002/0122974 A1*  9/2002   Kim ..................... H01M 50/166
                                                    429/231.95

(Continued)

FOREIGN PATENT DOCUMENTS

CN          1297587 A        5/2001
CN          1374711 A        10/2002
(Continued)

OTHER PUBLICATIONS

Espacenet machine translation of KR-2016049889-A (Year: 2016).*
(Continued)

*Primary Examiner* — Dah-Wei D. Yuan
(74) *Attorney, Agent, or Firm* — Rimon P.C.

(57)          ABSTRACT

A battery module including a plurality of batteries, and a busbar electrically connecting the batteries. The battery includes: a battery can including a cylindrical portion, a bottom wall closing one end of the cylindrical portion, and an open rim continuing to the other end of the cylindrical portion; an electrode body; and a sealing body which seals an opening defined by the open rim. The sealing body has a first principal surface facing an interior of the battery can, a second principal surface opposite to the first principal surface, and a side surface connecting the first principal surface with the second principal surface. The busbar has a plurality of through-holes fitted with the batteries. The open rim of each of the batteries fitted into the through-holes is at least partially in contact with the busbar. The sealing body and the busbar are electrically insulated from each other.

7 Claims, 13 Drawing Sheets

(51) Int. Cl.

| | |
|---|---|
| *H01M 10/0525* | (2010.01) |
| *H01M 50/107* | (2021.01) |
| *H01M 50/147* | (2021.01) |
| *H01M 50/152* | (2021.01) |
| *H01M 50/184* | (2021.01) |
| *H01M 50/186* | (2021.01) |
| *H01M 50/213* | (2021.01) |
| *H01M 50/50* | (2021.01) |
| *H01M 50/505* | (2021.01) |

(52) U.S. Cl.
  CPC ....... *H01M 50/107* (2021.01); *H01M 50/147*
    (2021.01); *H01M 50/152* (2021.01); *H01M*
    *50/184* (2021.01); *H01M 50/186* (2021.01);
    *H01M 50/213* (2021.01); *H01M 50/50*
    (2021.01); *H01M 50/505* (2021.01)

(58) Field of Classification Search
  CPC ............. H01M 50/505; H01M 50/531; H01M
    50/533; H01M 50/559
  See application file for complete search history.

(56) References Cited

U.S. PATENT DOCUMENTS

| | | | |
|---|---|---|---|
| 2005/0058898 A1 | 3/2005 | Dokko | |
| 2008/0131768 A1* | 6/2008 | Lee ..................... | H01M 50/171 |
| | | | 429/174 |
| 2011/0081566 A1 | 4/2011 | Kobayashi et al. | |
| 2012/0164490 A1 | 6/2012 | Itol et al. | |
| 2013/0216870 A1* | 8/2013 | Kim ................... | H01M 50/574 |
| | | | 429/61 |
| 2014/0045038 A1 | 2/2014 | Kimura et al. | |
| 2014/0113167 A1 | 4/2014 | Itoi et al. | |
| 2015/0140369 A1 | 5/2015 | Itoi et al. | |
| 2018/0083251 A1 | 3/2018 | Newman et al. | |
| 2020/0044200 A1 | 2/2020 | Ochs et al. | |

FOREIGN PATENT DOCUMENTS

| | | | | | | |
|---|---|---|---|---|---|---|
| CN | 1599091 | A | | 3/2005 | | |
| CN | 102047466 | A | | 5/2011 | | |
| CN | 102473884 | A | | 5/2012 | | |
| CN | 103262291 | A | | 8/2013 | | |
| CN | 206685445 | U | * | 11/2017 | | |
| DE | 102016219302 | A1 | | 4/2018 | | |
| EP | 0037122 | A1 | * | 10/1981 | ........ | H01M 10/0525 |
| JP | 3-51887 | U | | 5/1991 | | |
| JP | 2916236 | B2 | | 7/1999 | | |
| JP | 2000348707 | A | | 12/2000 | | |
| JP | 2007-66835 | A | | 3/2007 | | |
| JP | 2007066835 | A | | 3/2007 | | |
| JP | 2009266714 | A | * | 11/2009 | | |
| JP | 5466906 | B2 | | 4/2014 | | |
| JP | 5660204 | B2 | | 1/2015 | | |
| JP | 2016-516273 | A | | 6/2016 | | |
| KR | 2016049889 | A | * | 5/2016 | .......... | H01M 10/058 |
| KR | 20180005455 | A | * | 1/2018 | ........ | H01M 10/4235 |
| WO | 2014/164560 | A1 | | 10/2014 | | |

OTHER PUBLICATIONS

Espacenet machine translation of KR-20180005455-A (Year: 2018).*
Espacenet machine translation of JP-2009266714-A (Year: 2009).*
International Search Report issued in International Application No. PCT/JP2019/013348, dated Jun. 4, 2019, with English translation.
Extended European Search Report dated Mar. 25, 2021 issued in the corresponding European Patent Application No. 19781012.0.
Chinese Office Action dated Aug. 3, 2022 with its partial English translation issued in the corresponding Chinese Patent Application No. 201980023864.6.
English translation of Japanese Office Action issued in the corresponding Japanese Patent Application No. JP 2020-511720, mailed Jan. 10, 2023.

\* cited by examiner

BATTERY MODULE

CROSS-REFERENCE OF RELATED APPLICATIONS

This application is the U.S. National Phase under 35 U.S.C. § 371 of International Patent Application No. PCT/JP2019/013348, filed on Mar. 27, 2019, which in turn claims the benefit of Japanese Application No. 2018-074200, filed on Apr. 6, 2018, and Japanese Application No. 2018-074201, filed on Apr. 6, 2018, the entire disclosures of which Applications are incorporated by reference herein.

TECHNICAL FIELD

The present invention relates to a battery module including a plurality of batteries and a busbar electrically connecting these batteries.

BACKGROUND ART

In some actual use of a battery, a plurality of batteries are used in parallel or series connection. In such a use, the electrode of each of the batteries is electrically connected to each other via a busbar (see Patent Literature 1).

CITATION LIST

Patent Literature

[PTL 1] Japanese Laid-Open Patent Publication No. 2016-516273

SUMMARY OF INVENTION

Technical Problem

In a battery including a battery can whose opening is sealed with a sealing body, the battery can usually functions as an external terminal of one electrode, while the sealing body functions as an external terminal of the other electrode. For example, as disclosed in Patent Literature 1, electric current at the negative electrode is collected from the bottom of the battery can. On the other hand, electric current at the positive electrode is collected from the sealing body placed opposite to the bottom of the battery can. In other words, when connecting external lead wires respectively to the electrodes, an external lead wire for the negative electrode is extended from the undersurface of the battery, and an external lead wire for the positive electrode is extended from the top surface of the battery. Therefore, a space for wiring is necessary in the upward and downward directions.

In the case of collecting current from both electrodes on the sealing body side of the battery, the external lead wires for the positive electrode and the negative electrode are arranged in proximity to each other. In view of reliability, it is necessary to prevent the external lead wires for the positive electrode and the negative electrode from coming in contact with each other. However, with increase in the number of batteries to be connected, the wiring becomes complicated, increasing the possibility that the external lead wires inadvertently come in contact with each other. To prevent this contact, a wider space for wiring is required.

Solution to Problem

One aspect of the present invention relates to a battery module including a plurality of batteries, and a busbar electrically connecting the plurality of batteries, the battery including: a battery can including a cylindrical portion, a bottom wall closing one end of the cylindrical portion, and an open rim continuing to the other end of the cylindrical portion; an electrode body housed in the cylindrical portion; and a sealing body fixed to the open rim so as to seal an opening defined by the open rim, the sealing body having a first principal surface facing an interior of the battery can, a second principal surface opposite to the first principal surface, and a side surface connecting the first principal surface with the second principal surface, the busbar having a plurality of through-holes fitted with the batteries, wherein the open rim of each of the batteries fitted into the through-holes is at least partially in contact with the busbar, the open rim and the busbar are electrically connected to each other, and the sealing body and the busbar are electrically insulated from each other.

Advantageous Effects of Invention

According to the present invention, the space required for connecting batteries can be reduced.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1A:
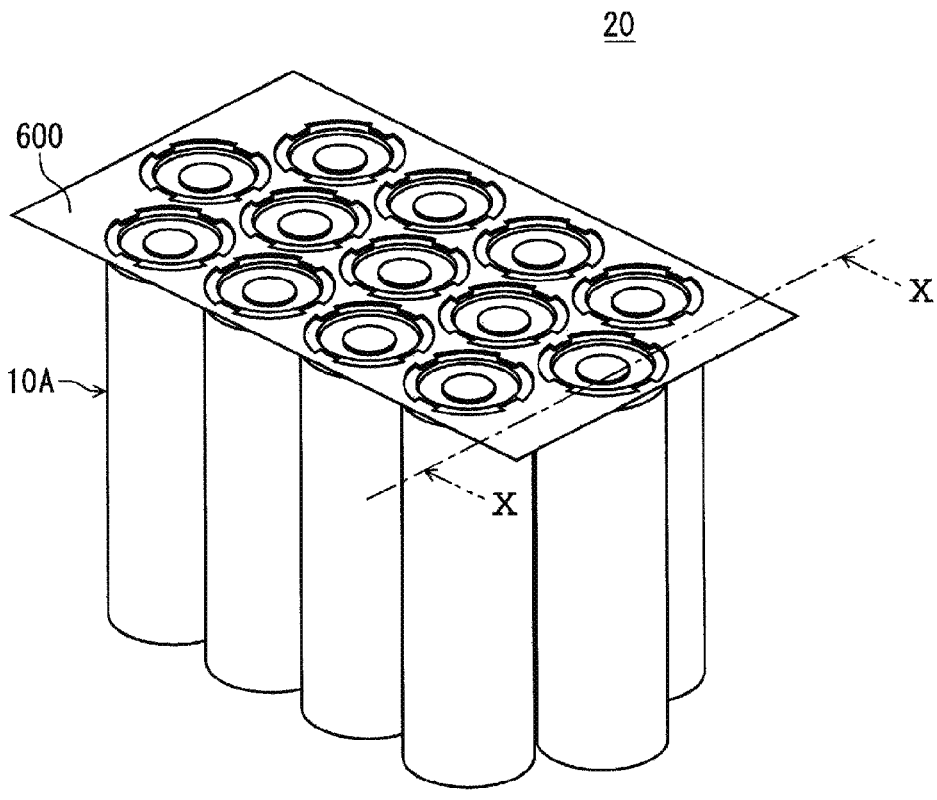
FIG. 1A A schematic oblique view of a battery module according to an embodiment of the present invention.

A battery module according to the present embodiment includes a plurality of batteries, and a busbar electrically connecting the plurality of batteries. The battery includes: a battery can including a cylindrical portion, a bottom wall closing one end of the cylindrical portion, and an open rim continuing to the other end of the cylindrical portion; an electrode body housed in the cylindrical portion; and a sealing body fixed to the open rim so as to seal an opening defined by the open rim. The sealing body has a first principal surface facing an interior of the battery can, a second principal surface opposite to the first principal surface, and a side surface connecting the first principal surface with the second principal surface. The busbar has a plurality of through-holes fitted with the batteries, and the open rim of each of the batteries fitted into the through-holes is at least partially in contact with the busbar. The open rim and the busbar are electrically connected to each other, whereas the sealing body and the busbar are electrically insulated from each other.

The sealing body functions as an external terminal of one electrode (e.g., positive electrode) of the battery. On the other hand, the battery can is directly fitted into the through-hole of the busbar, allowing the busbar to function as an external terminal and an external lead wire of the other electrode (e.g., negative electrode) of the battery. Thus, the wiring is extremely simplified, which can save the space for wiring. Furthermore, since the busbar is arranged on the open rim side, electric current from both of the electrodes can be collected in the vicinity of the sealing body (e.g., on the second principal surface side).

The busbar may have a first portion covering at least part of the side surface of the sealing body, with the open rim of the battery can therebetween. The first portion, for example, rises from the periphery of the through-hole, along the open rim of the battery can. In other words, the cross section of the through-hole along an axial direction (hereinafter sometimes referred to as Z direction) of the battery can may be approximately L-shaped at the periphery. This can increase the contact area with the battery can, which can improve the current-collecting ability. Furthermore, this can help to determine the direction of the battery when fitted into the busbar.

The busbar may have a second portion covering at least part of an outer periphery of the sealing body on the second principal surface. The second portion extends from the periphery of the through-hole toward the center of the through-hole, and partially closes the through-hole. This can help to determine the insertion amount of the battery can when fitted into the busbar. Furthermore, this increases the area of the busbar, which can reduce the resistance. The second portion and the second principal surface of the sealing body may be interposed by the open rim of the battery can.

The busbar may have both the first portion and the second portion. In this case, the battery can be fixedly secured to the busbar with ease.

The busbar according to the present embodiment is particularly useful when an end surface of the open rim is on the side surface of the sealing body, that is, when the open rim of the battery can does not cover the second principal surface of the sealing body. Usually, in this case, without an external lead wire, it is difficult to collect current from both of the electrodes on the second principal surface side of the sealing body. However, by using the busbar configured to be fitted with the battery can, current can be easily collected from the electrode with the same potential as the battery can, without using an external lead wire, on the second principal surface side of the sealing body.

The sealing body, for example, includes a sealing plate with electrical conductivity, and a gasket with electrically insulating properties disposed at a peripheral portion of the sealing plate.

When the end surface of the open rim is on the side surface of the sealing body, the gasket may partially protrude beyond the end surface of the open rim in the axial direction of the battery can. The gasket provides more reliable electrical insulation between the sealing body (sealing plate) and the busbar.

When the end surface of the open rim is on the side surface of the sealing body, in a height direction of the battery can, the open rim is preferably smaller in outer diameter at a lowest position in contact with the sealing body, than the cylindrical portion. This clarifies the boundary between the open rim and the cylindrical portion, which can help to determine the insertion amount of the battery can when fitted into the busbar.

A description will be given below of a battery module and a battery according to an embodiment of the present invention, with reference to the drawings as appropriate. The present invention, however, is not limited thereto. In the illustrated example, the components having the same function are denoted by the same reference numeral.

Figure 1B:
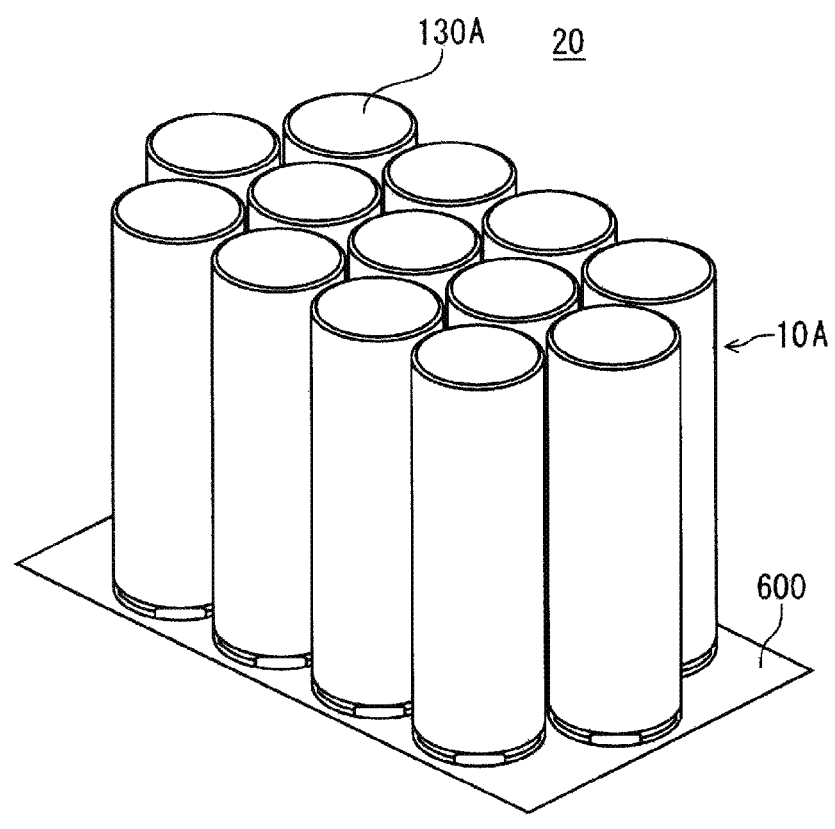
FIG. 1B An oblique view of the battery module shown in FIG. 1A as viewed from the side opposite to FIG. 1A.
Figure 1C:
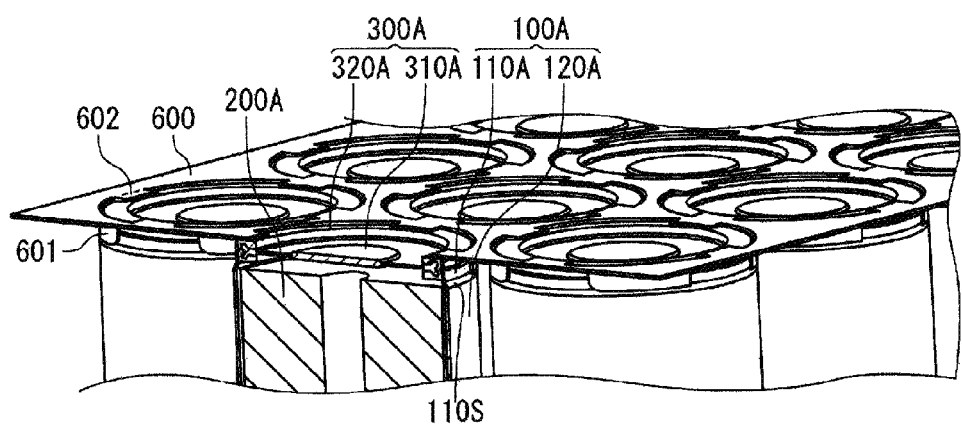
FIG. 1C A schematic vertical cross-sectional view partially showing a cross section taken along a line X-X in FIG. 1A.
Figure 2A:
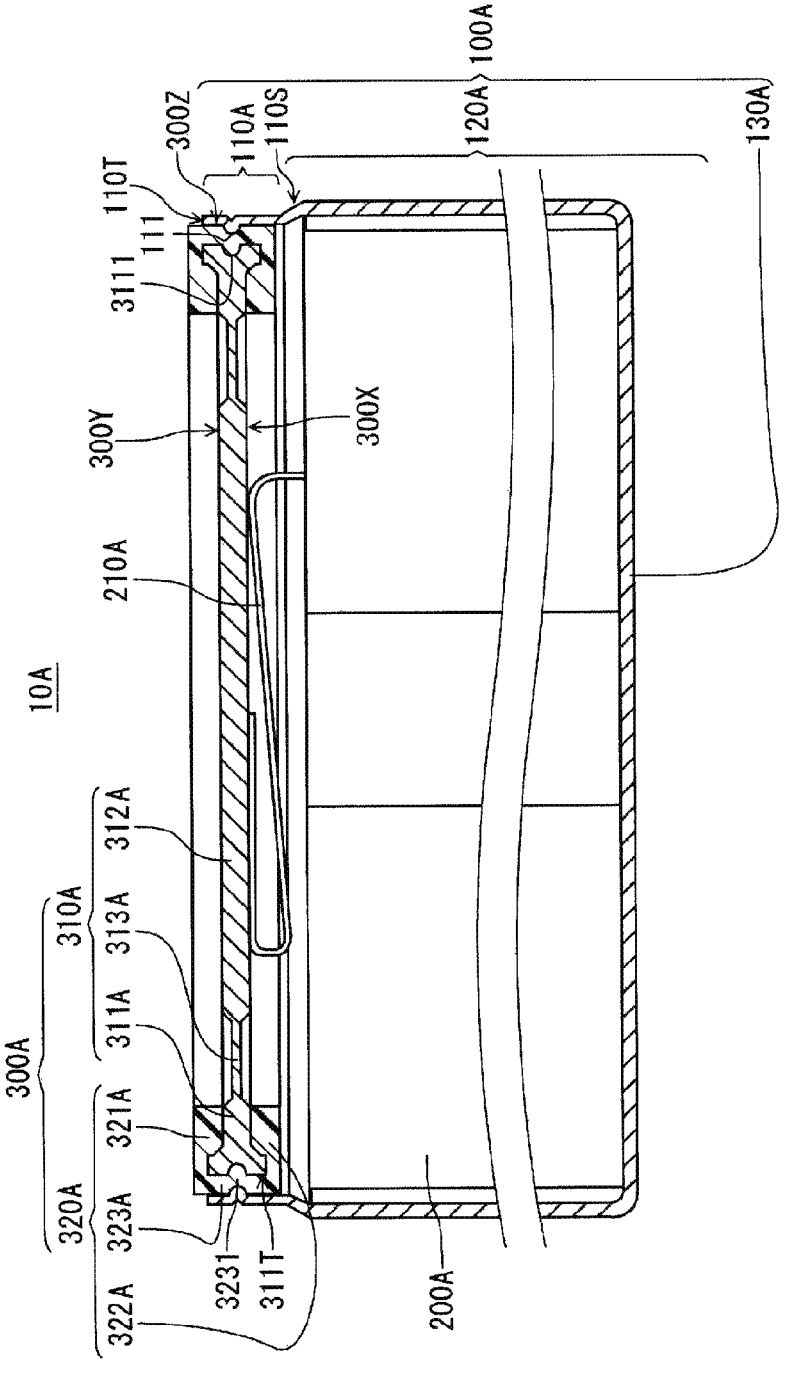
FIG. 2A A schematic vertical cross-sectional view of a battery according to an embodiment of the present invention.
Figure 2B:
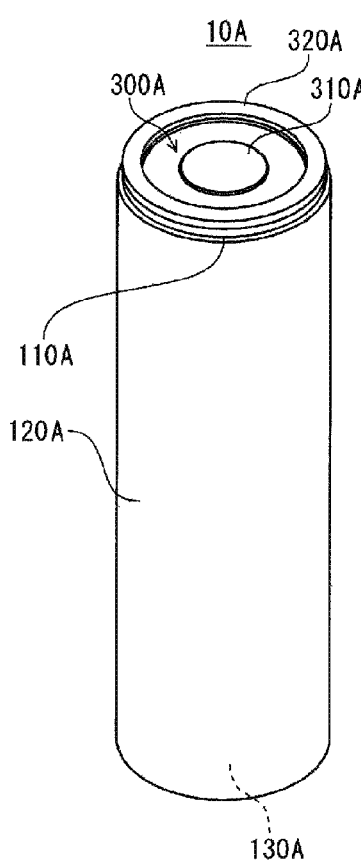
FIG. 2B An oblique view of the battery of FIG. 2A.
Figure 3A:
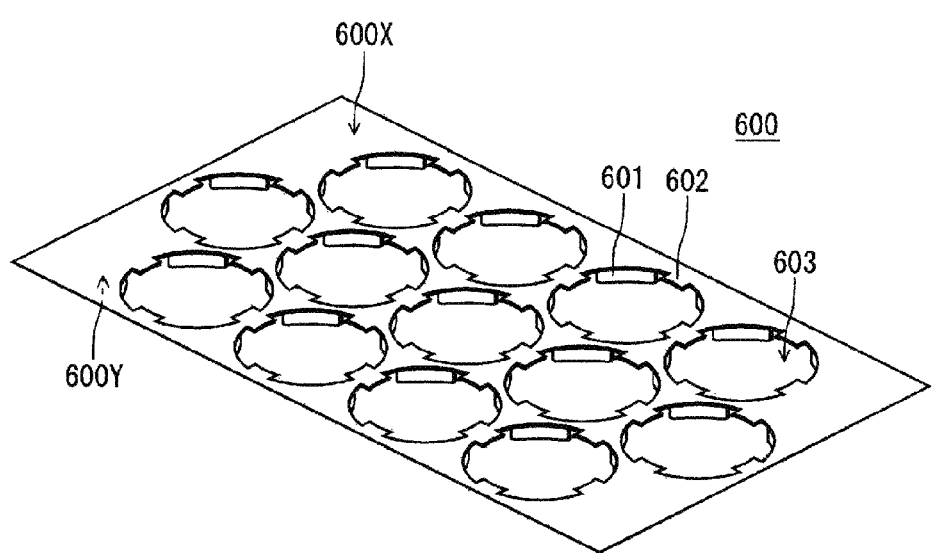
FIG. 3A A schematic oblique view of a busbar according to an embodiment of the present invention.
Figure 3B:
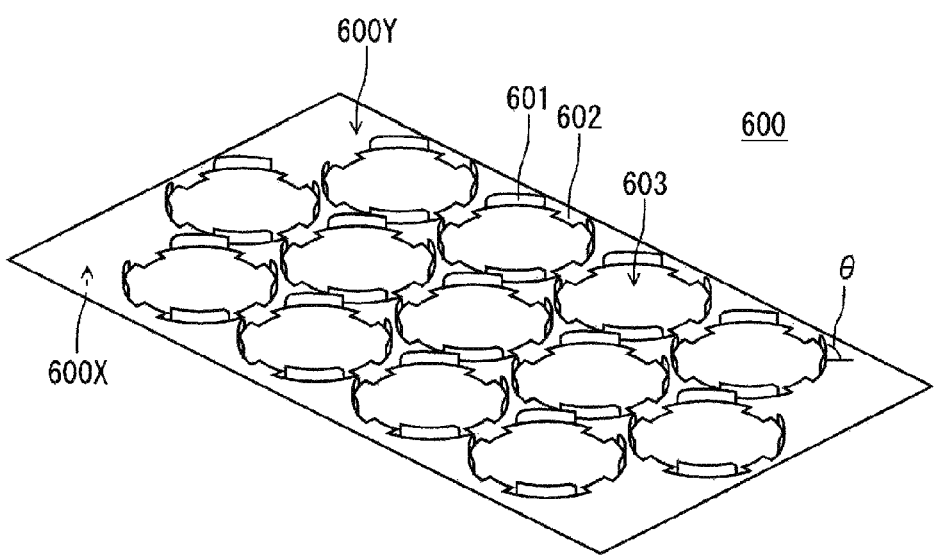
FIG. 3B An oblique view of the busbar shown in FIG. 3A as viewed from the side opposite to FIG. 3A.

FIG. 1A is a schematic oblique view of a battery module according to the present embodiment. FIG. 1B is an oblique view of the battery module as viewed from the side opposite to FIG. 1A. FIG. 1C is a schematic vertical cross-sectional view partially showing a cross section taken along a line X-X in FIG. 1A. FIG. 2A is a schematic vertical cross-sectional view of a battery according to the present embodiment. FIG. 2B is an oblique view of the battery of FIG. 2A. FIG. 3A is a schematic oblique view of a busbar according to the present embodiment. FIG. 3B is an oblique view of the busbar as viewed from the side opposite to FIG. 3A.

A battery 10A is cylindrical in shape, and includes a cylindrical bottomed battery can 100A, a cylindrical electrode body 200A housed in the battery can 100A, and a sealing body 300A sealing the opening of the battery can 100A, and a busbar 600 electrically connected to the battery can 100A and electrically insulated from the sealing body 300A. A plurality of the batteries 10A are fitted into a plurality of through-holes 603 (see FIG. 3A) provided in the busbar 600.

The battery can 100A includes: a cylindrical portion 120A housing the electrode body 200A; a bottom wall 130A closing one end of the cylindrical portion 120A; and an open rim 110A continuing to the other end of the cylindrical portion 120A. The opening defined by the open rim 110A is closed with the sealing body 300A.

In the height direction of the battery can 100A, the open rim 110A of the battery can 100A may be smaller in outer diameter at a lowest position in contact with the sealing body 300A, than the cylindrical portion 120A. This clarifies the boundary between the open rim 110A and the cylindrical portion 120A, which can help to determine the insertion amount of the battery can 100A when fitted into the busbar 600.

For example, the open rim 110A may has, at the boundary with the cylindrical portion 120A, a tapered region 110S where the outer diameter of the cylindrical portion 120A is gradually reduced. The tapered region 110S forms an angle of, for example, less than 45° with respect to the Z direction.

The sealing body 300A has a first principal surface 300X facing an interior of the battery can 100A, a second principal surface 300Y opposite to the first principal surface 300X, and a side surface 300Z connecting the first principal surface 300X with the second principal surface 300Y. An end surface 110T of the open rim 100A is on the side surface 300Z of the sealing body 300A, and the open rim 100A does not cover the outer periphery of the second principal surface 300Y of the sealing body 300A.

By using the busbar 600 having through-holes, even when the open rim 110A does not cover the second principal surface 300Y, current from the electrode with the same potential as the battery can 100A can be collected, without using an external lead wire, on the second principal surface 300Y side.

Note that the end surface 110T of the open rim 110A may be on the second principal surface 300Y of the sealing body 300A. That is, part of the open rim 110A may cover the outer periphery of the second principal surface 300Y.

The busbar 600 is a plate-like member having, for example, a third principal surface 600X and a fourth principal surface 600Y opposite thereto, and is provided with the through-holes 603 passing through from the third principal surface 600X to the fourth principal surface 600Y. The battery 10A is fitted into the through-hole 603, for example, from the fourth principal surface 600Y side of the busbar 600.

The busbar 600 has a first portion 601 covering the side surface 300Z of the sealing body 300A, with the open rim 110A of the battery can 100A therebetween, and a second portion 602 covering the outer periphery of the second principal surface 300Y of the sealing body 300A. A joining material having electrical conductivity may be interposed between the first portion 601 and the outer surface of the open rim 110A.

The first portion 601 rises from the periphery of the through-hole 603, along the open rim 110A of the battery can 100A. The second portion 602 extends from the periphery of the through-hole 603 toward the center of the through-hole 603, and partially closes the through-hole 603. Note that the shape of the busbar 600 is not limited thereto.

A portion to be the first portion 601 is formed simultaneously with the second portion 602, for example, when forming the through-holes 603 by punching a plate-like member used as a material of the busbar 600. Thereafter, the above portion is bent into the first portion 601.

In the illustrated example, the diameter of the through-hole 603 is almost the same as the outer diameter of the sealing body 300A, and the busbar 600 is electrically connected to the battery can 100A via the contact of the first portion 601 with the open rim 110A. The insertion amount of the battery 10A into the busbar 600 is regulated by the second portion 602.

In this case, in a no-load state, the first portion 601 preferably forms an angle θ (see FIG. 3B) of 90 degrees or more, with respect to the fourth principal surface 600Y. In other words, the first portion 601 is preferably raised so as to make the diameter of the through-hole 603 smaller. By press-fitting the battery 100A into the busbar 600 provided with the first portion 601 as above, the first portion 601 and the open rim 110A come easily in contact with each other, further improving the current-collecting ability.

The angle θ may be, for example, 90 degrees to 95 degrees.

The sealing body 300A has a sealing plate 310A, and a gasket 320A disposed at a peripheral portion 311A of the sealing plate 310A. The sealing plate 310A is circular-shaped or disk-shaped, and has an explosion-proof function. Specifically, the sealing plate 310A has the peripheral portion 311A and a center region 312A, both having a thick wall thickness and serving to provide structural strength, and a thin-walled portion 313A configured to exhibit an explosion-proof function. The thin-walled portion 313A is provided in an annular region between the peripheral portion 311A and the center region 312A. To the inner surface of the center region 312A, one end of a lead wire 210A extended from a positive electrode or a negative electrode constituting the electrode body 200A is connected. Thus, the sealing plate 310A functions as a terminal of one of the electrodes. Therefore, according to the present embodiment, current from both electrodes of the battery 10A can be both collected on the second principal surface 300Y side of the sealing body 300A.

When the internal pressure of the battery can 100A rises, the sealing plate 310A bulges outward, and the stress due to tension is concentrated, for example, on the boundary between the peripheral portion 311A and the thin-walled portion 313A, causing a break to occur from the boundary. As a result, the internal pressure of the battery can 100A is released, and the safety of the battery 10A can be ensured. Note that the shape of the sealing plate 300A is not limited thereto.

The gasket 320A has an outer ring portion 321A and an inner ring portion 322A, and a side wall portion 323A connecting the outer ring portion 321A with the inner ring portion 322A. An end surface 311T of the peripheral portion 311A of the sealing plate 310A is covered with the side wall portion 323A. The outer ring portion 321A and the inner ring portion 322A sandwich the peripheral portion 311A of the sealing plate 310A therebetween, and thereby the gasket 320A is secured to the sealing plate 310A.

The open rim 100A is smaller in outer diameter at the lowest position in contact with the inner ring portion 322A of the gasket 320A, than the cylindrical portion 120A, in the height direction of the battery can 100A of the battery 10A. The outer ring portion 321A protrudes in the Z direction of the battery can 100A beyond the end face 110T of the open rim 110A. In this case, the busbar 600 is particularly useful. The outer ring portion 321A can provide reliable electrical insulation between the sealing plate 310A and the busbar 600.

The outer ring portion 321A, the inner ring portion 322A, and the side wall portion 323A are formed as an integrally molded product. The gasket 320A can be integrally molded with the sealing plate 310A, for example, by an insert molding technique. According to the integral molding, the sealing plate 310A and the gasket 320A are easily brought into close contact with each other. Formed by integrally molding the sealing plate 310A and the gasket 320A together, the sealing body 300A can be handled as one component member, which can simplify the production of the battery 10A.

In view of not disturbing the explosion-proof function, the busbar 600 preferably does not cover the thin-walled portion 313A, and more preferably does not cover the boundary between the peripheral portion 311A and the thin-walled part 313A. Specifically, the through-hole 603 preferably has a diameter that is not so large as to cover the thin-walled part 313A. The through-hole 603 has a diameter, for example, larger than the inner diameter of the outer ring portion 321A of the gasket 320A, and equal to or less than the outer diameter of the outer ring portion 321A.

From the similar point of view, the second portion 602 of the busbar 600 preferably does not cover the thin-walled portion 313A, and more preferably does not cover the boundary between the peripheral portion 311A and the thin-walled part 313A. The second portion 602 extends from the periphery of the through-hole 603 to, for example, somewhere before the boundary between the peripheral portion 311A and the thin-walled part 313A. Preferably, the second portion 602 extends from periphery of the through-hole 603, with the entire portion of the second portion being on the outer ring portion 321A.

In the present embodiment, at least part of the open rim 110A preferably presses the side wall portion 323A of the gasket 320A against the end face 311T of the peripheral portion 311A of the sealing plate 310A, so that the side wall portion 323A is compressed in the radial direction of the opening. In this way, the airtightness between the open rim 110A of the battery can 100A and the sealing body 300A can be easily ensured. For example, the open rim 110A presses the gasket 320A not in the Z direction but in the direction perpendicular to the Z direction (hereinafter, sometimes referred to as XY direction). In this case, given that the pressing force of the open rim 110A exerted on the gasket 320A is decomposed in two directions: Z and XY, the scalar quantity of the vector in the XY direction is larger than that in the Z direction.

A description will be given below of the sealing plate 310A, the gasket 320A, and the open rim 110A suitably applicable to the case where the open rim 110A presses the gasket 320A in the XY direction.

In FIG. 2A, a projection 111 constricted inward is formed on the inner side of the open rim 110A, along the circumferential direction of the opening. This projection 111 presses the side wall portion 323A against the end surface 311T. The side wall portion 323A of the gasket 320A may be provided with a recessed portion 3231 in advance at a position corresponding to the projection 111. Providing the recessed portion 3231 on the gasket 320A can prevent the gasket 320A from being excessively deformed when the side wall 323A is compressed.

The projection 111 may be formed intermittently in a plurality of numbers along the circumferential direction of the opening, or may be formed continuously along the circumferential direction of the opening. The continuously formed projection 111 can form an annular groove along the circumferential direction of the opening. The projection(s) 111 can press the gasket 320A or its side wall portion 323A more strongly toward an end surface 311T of the peripheral portion 311A of the sealing plate 310A. In this way, the airtightness between the sealing body 300A and the open rim 110A can be more reliably ensured. When the projection 111 is formed intermittently in a plurality of numbers, the projections 111 (at least two, preferably four or more projections) are provided preferably at equi-angular intervals with respect to the center of the opening.

In the height direction of the battery can 100A, the projection 111 is preferably substantially equal in position to the center of the end surface 311T. By aligning like this, the deformation of the sealing plate 310A and the gasket 320A can be suppressed. Moreover, the pressure applied to the gasket 320A or its side wall portion is unlikely to be non-uniform. Accordingly, the deformation of the gasket 320A tends to be suppressed, and the gasket 320A can be compressed to a higher degree. This can more reliably ensure the airtightness between the sealing body 300A and the open rim 110A.

That the projection 111 is substantially equal in position to the center of the end surface 311T of the sealing plate 310A means that, in the height direction of the battery can 100A, the difference between the position of the projection 111 and the center position of the end surface 311T of the sealing plate 310A is 4% or less of a height H of the battery can 100A.

A recessed groove 3111 is formed at the center position of the end surface 311T of the peripheral portion 311A so as to correspond to the projection 111 of the open rim 110A.

The difference between the center position of the recessed groove 3111 and the position of the projection 111 in the height direction of the battery can 100A is 4% or less of the height H of the battery can 100A.

According to the above configuration, it is not necessary to press the gasket in the Z direction for hermetically sealing the battery can. This eliminates the necessity of providing the battery can 100A with a constricted portion interposed between the gasket 320A and the electrode body 200A. In this case, the shortest distance between the sealing body 300A and the electrode body 200A can be set to, for example, 2 mm or less, and preferably 1.5 mm or less, more preferably 1 mm or less.

Figure 4A:
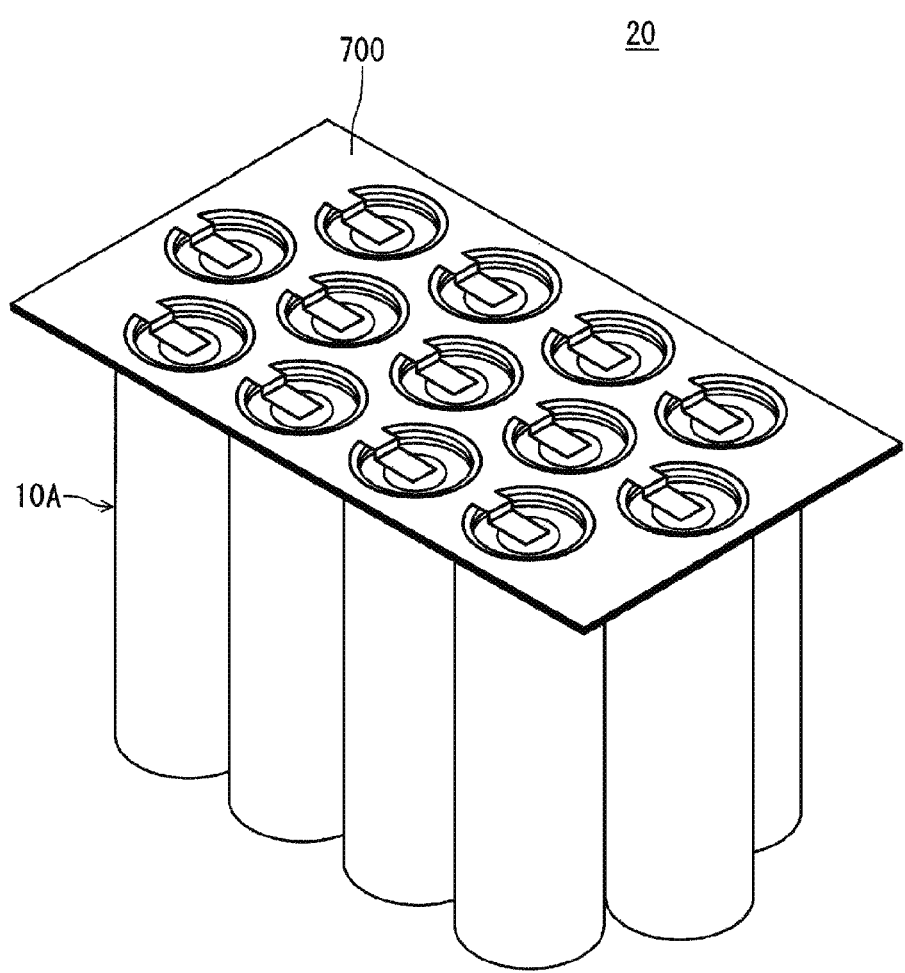
FIG. 4A A schematic oblique view of another battery module according to an embodiment of the present invention.
Figure 4B:
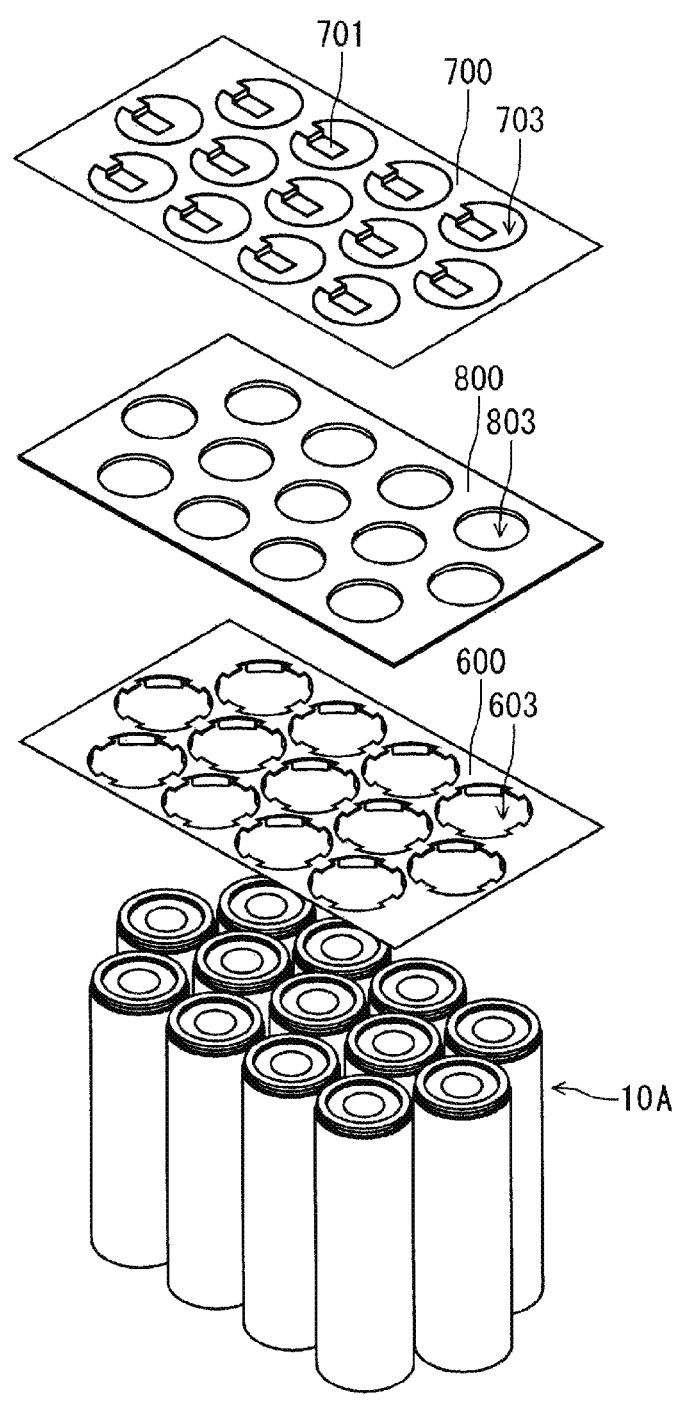
FIG. 4B An exploded oblique view of the battery module of FIG. 4A.

Electric current from the electrode with the same potential as the sealing body 310A may be collected via the busbar. This further simplifies the connection structure. FIG. 4A is a schematic oblique view of a battery module configured to collect current via the busbar from the electrode with the same potential as the sealing body. FIG. 4B is an exploded oblique view of the battery module of FIG. 4A.

Current from the electrode with the same potential as the sealing plate is collected via, for example, a second busbar 700 being a plate-shaped member. The second busbar 700 may be similarly shaped to the above busbar 600 (hereinafter, sometimes referred to as first busbar 600) and disposed so as to be stacked on the first busbar 600. The second busbar 700 has second through-holes 703 corresponding to the through-holes 603 of the first busbar 600.

The second busbar 700 has a third portion 701 that comes in contact with the sealing plate. The third portion 701 comes in contact with, for example, the center region of the sealing plate. The third portion 701 extends from the periphery of the second through-hole 703 toward the center region of the sealing plate, and partially closes the second through-hole 703.

The first busbar 600 and the second busbar 700 are interposed by an electrically insulating member 800. The insulating member 800 also has third through-holes 803 corresponding to the through-holes 603 of the first busbar 600.

An internal lead wire may be connected to the sealing plate and securely attached to the gasket. This can reduce the space occupied by the safety mechanism within the battery, easily leading to a higher capacity.

In the following, a direction from the sealing body toward the electrode body is referred to as a downward direction, and a direction from the electrode body toward the sealing body is referred to as an upward direction. In general, when the battery can is placed upright with the bottom side down, a direction parallel to the axis of the cylindrical portion and toward the open rim is the upward direction.

Conventionally, in order to realize a battery having both an explosion-proof function and an overcurrent shutdown function, it has been necessary to include two members in the battery: one that exerts an explosion-proof function (explosion-proof valve) and one that serves to shut down the current. These members have occupied a certain amount of space in the battery.

The overcurrent shutdown function can be realized as follows: in normal operation, the internal lead wire extended from the electrode body is electrically connected to the sealing plate, but in the event of abnormality, the electrical connection between the internal lead wire and the sealing plate is shut down. In the case where the internal lead wire is securely attached to the sealing plate, in the event of abnormality, as the sealing plate bulges and deforms in the upward direction when the internal pressure rises, the internal lead wire deforms following the deformation of the sealing plate, failing to shut down the current. For this reason, in the conventional configuration, the overcurrent shutdown function has been realized by securely attaching the lead wire to a member that serves to shut down the current (lead-attaching member), and controlling the electrical connection between the explosion-proof valve and the lead-attaching member. The conventional configuration, therefore, has required at least two components: the explosion-proof valve and the lead-attaching member.

On the other hand, in the case of securely attaching the internal lead wire to the gasket, the internal lead wire can be made function as a member that serves to shut down the current. This can reduce the number of components required for the safety mechanism. Furthermore, the space occupied by the safety mechanism in the battery can be saved. The saved space can be allocated to the volume of the electrode body, leading to a higher capacity.

That the internal lead wire is securely attached to the gasket means that, even when a pressure is applied to the sealing body in the upward direction due to an increase in the battery internal pressure, the deformation of the internal lead wire is restricted by the gasket, so that the internal lead wire will not deform following the deformation of a member, such as the sealing plate, which is electrically connected to the internal lead wire.

The gasket has: for example, an inner ring portion disposed on the side facing the electrode body (the inner side) of the peripheral portion of the sealing plate; an outer ring portion disposed on the side opposite the electrode body (the outer side) of the peripheral portion of the sealing plate; and a side wall portion covering the end surface of the peripheral portion of the sealing plate. In this case, the gasket may further include a lead holding portion disposed continuously with the inner ring portion so as to face the electrode body. The internal lead wire is securely attached to the gasket via the lead holding portion. The inner ring portion, the outer ring portion, the side wall portion, and the lead holding portion may be integrally molded together.

The lead holding portion may have a securing portion for securing an internal lead wire. The securing portion may be formed integrally with the lead holding portion, or may be a separate member to be attached onto the lead holding portion. In the latter case, the lead holding portion may be provided with an attaching portion for attaching the securing portion.

The lead holding portion may be disposed such that, for example, the internal lead wire is allowed to extend along the plane direction of the sealing plate, and the lead holding portion is interposed between the lead wire extending along the plane direction and the sealing plate. In this way, the internal lead wire can be securely attached to the gasket.

The lead holding portion preferably has a pipe portion through which the internal lead wire is inserted along the plane direction of the sealing plate. The pipe portion may be formed by a snap-fit mechanism.

The securing portion is preferably formed of a pipe member. The internal lead wire is passed through the pipe member, and thereby, the internal lead wire is secured to the lead holding portion. The internal lead wire is thus securely attached to the gasket.

The pipe member may be assembled by a snap-fit mechanism. For example, the pipe of the pipe member can be easily formed by, for example, employing a clip system.

More preferably, the sealing body is an integral molded product of a sealing plate and a gasket. An exemplary integral molding method is insert molding. Formed by integrally molding the sealing plate and the gasket together, the sealing body can be handled as one component member, which can simplify the production of a battery.

When the sealing body is an integral molded product of a sealing plate and a gasket, the gasket can be formed in any shape. The gasket therefore can be formed such that the securing portion is formed in the lead holding portion, or such that the attaching portion for attaching the securing portion is formed in the lead holding portion.

For sealing the open rim of the battery can, typically, a constricted portion is formed between the open rim and the cylindrical portion, such that the constricted portion becomes smaller in inner diameter than the open rim and the cylindrical portion. On the constricted portion, a sealing body is placed, and then the sealing body is pressed in the upward and downward directions via the open rim of the battery can, so that the open rim is crimped so as to curl over the gasket and the sealing plate. The sealing body formed by integrally molding the sealing plate and the gasket together is preferably applicable not only to a battery produced by the sealing method as described above, but also to a battery sealed by a method without providing the conventional constricted portion. Without the constricted portion, the width (height) of the electrode body can be increased by an amount corresponding to the width (height) of the constricted portion, leading to a further higher battery capacity.

A description will be given below of a battery according to an embodiment of the present invention, with reference to the drawings as needed, with regard to the case where the internal lead wire is securely attached to the gasket, and the battery can has a constricted portion. The battery module according to the present embodiment may include a plurality of these batteries. The present invention, however, is not limited thereto.

Figure 5:
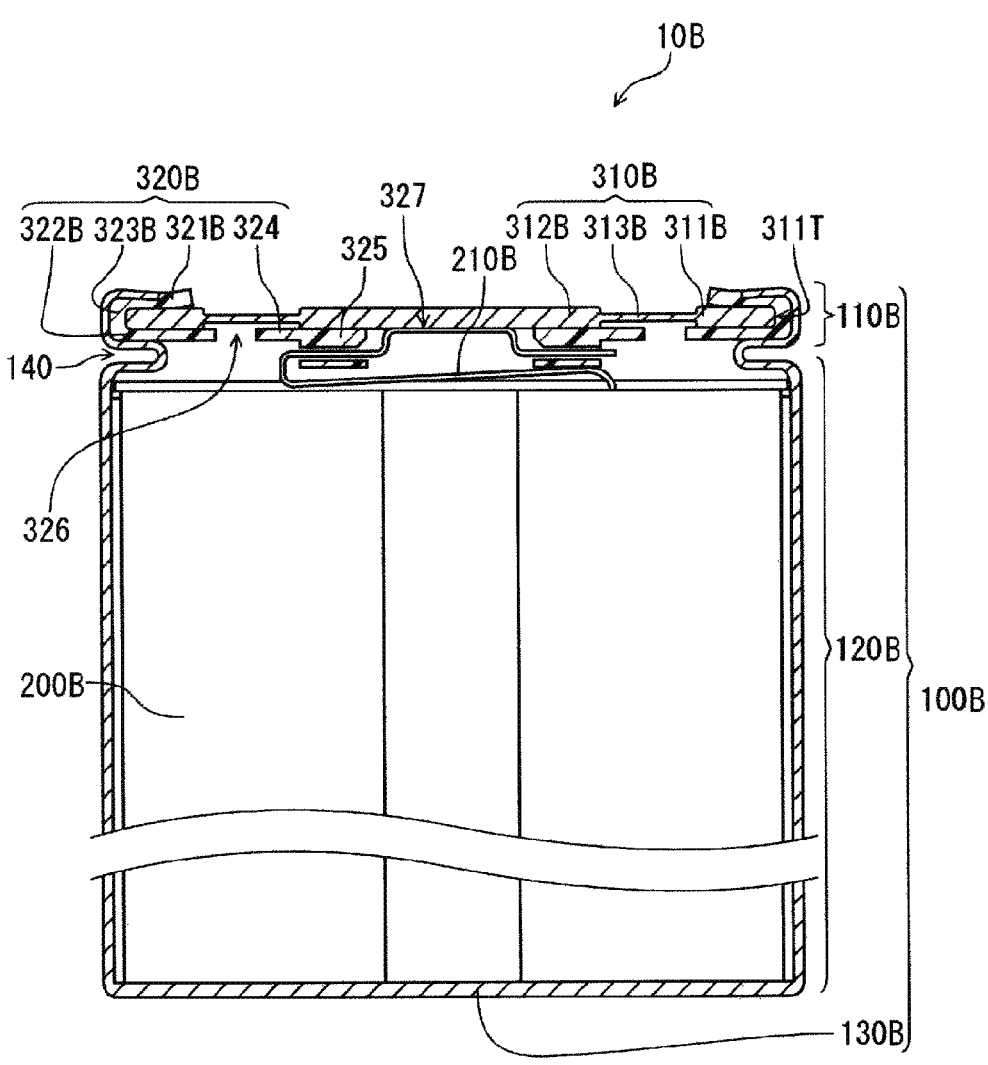
FIG. 5 A schematic vertical cross-sectional view of an essential part of a battery according to another embodiment of the present invention.
Figure 6:
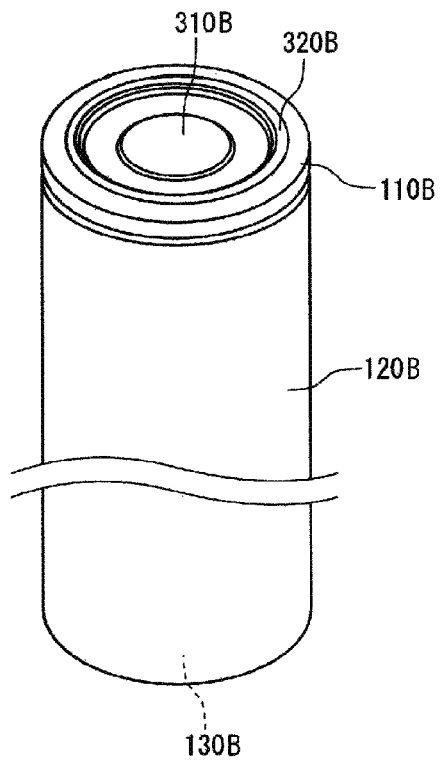
FIG. 6 An oblique view showing an appearance of a battery can in the battery.

The battery has a cylindrical shape and includes a cylindrical bottomed battery can, a cylindrical electrode body housed in the can, and a sealing body sealing an opening of the battery can. FIG. 5 is a schematic vertical cross-sectional view of an essential part of the battery according to the present embodiment, and FIG. 6 is an oblique view of the battery.

A battery can 100B includes a cylindrical portion 120B housing an electrode body 200B, a bottom wall 130B closing one end of the cylindrical portion 120B, and an open rim 110B continuing to the other end of the cylindrical portion 120B. The opening defined by the open edge 110B is closed by a sealing body 300B (see FIG. 7).

The sealing body 300B has a sealing plate 310B and a gasket 320B disposed at a peripheral portion 311B of the sealing plate 310B. The sealing plate 310B is circular-shaped or disk-shaped and has an explosion-proof function. Specifically, the sealing plate 310B has the peripheral portion 311B and a center region 312B, both having a thick wall thickness and serving to provide structural strength, and a thin-walled portion 313B configured to exhibit an explosion-proof function. The thin-walled portion 313B is provided in a region between the peripheral portion 311B and the center region 312B. To the inner surface of the center region 312B, one end of an internal lead wire 210B extended from a positive electrode or a negative electrode constituting the electrode body 200B is connected. Thus, the sealing plate 310B functions as a terminal of one electrode.

The gasket 320B has an outer ring portion 321B and an inner ring portion 322B, a side wall portion 323B connecting the outer ring portion 321B with the inner ring portion 322B, and a lead holding portion 324. The lead holding portion 324 is disposed continuously with the inner ring portion 322B so as to face the electrode body 200B, below the center region 312B of the sealing plate. An end face 311T of the peripheral portion 311B of the sealing plate 310B is covered with the side wall portion 323B.

The lead holding portion 324 may have a securing portion 325 for securing the internal lead wire 210B to the gasket 320B. The internal lead wire 210B is securely attached to the gasket 320B via the securing portion 325. The structure of the securing portion will be specifically described later.

The sealing body 300B may be an integral molded product of the sealing plate 310B and the gasket 320B. Note that, in this case, at least the securing portion 325 of the lead holding portion is not in close contact with the sealing plate 310B for preventing the securing portion 325 for securing the internal lead wire 210B from being deformed following the deformation of the sealing plate 310B that may occur in association with an increase in the internal pressure of the battery. The sealing plate 310B and the securing portion 325 are either in not contact with each other or in weak contact with each other, so that the sealing plate 310B gets disjoined from the securing portion 325 by a slight deformation of the sealing plate 310B that occurs in association with an increase in the internal pressure.

Between the cylindrical portion 120B of the battery can 100B and the open rim 110B, a constricted portion 140 is formed having an inner diameter smaller than that of the cylindrical portion of the open rim 110B and that of the cylindrical portion 120B. In other words, the open rim 110B is continuous with the cylindrical portion 120B via the constricted portion 140.

Between the inner ring portion 322B and the lead holding portion 324, a first aperture 326 is provided. At the center of the lead holding portion 324, a second aperture 327 is provided. The first aperture 326 and the second aperture 327 expose the lower surface of the sealing plate 310B (the surface facing the electrode body) therefrom. The first aperture 326 serves to transmit a pressure to the sealing plate 310B when the battery internal pressure becomes high. On the other hand, the second aperture 327 is provided to enable electrical connection between the sealing plate 310B and the internal lead wire 210B, in the center region 312B of the sealing plate 310B.

The outer ring portion 321B, the inner ring portion 322B, the side wall portion 323B, and the lead holding portion 324 are formed as an integrally molded product. The gasket 320B can be integrally molded with the sealing plate 310B, for example, by insert molding.

Figure 7:
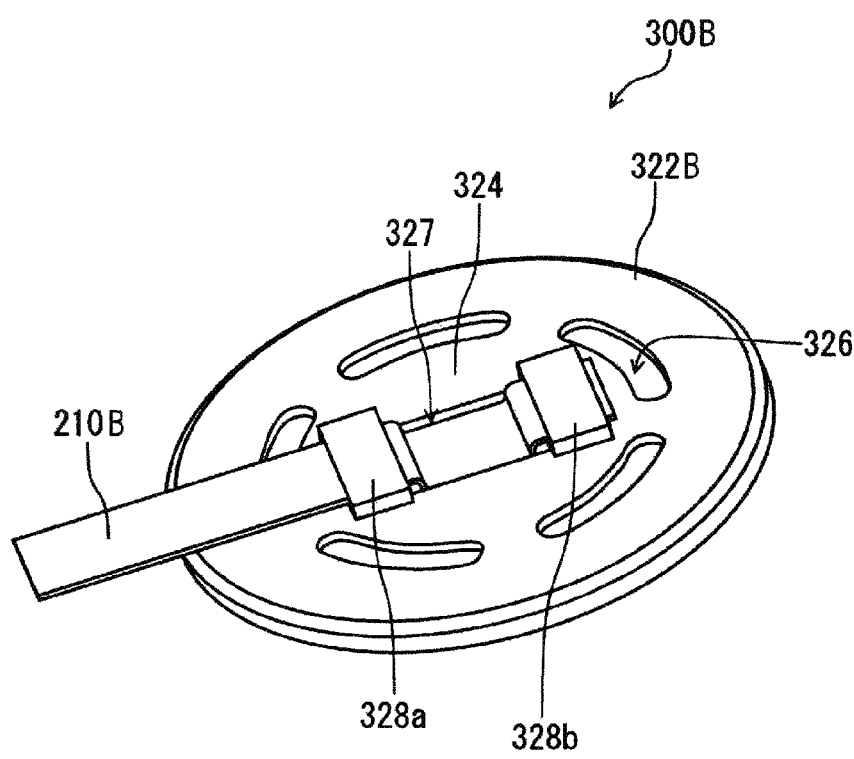
FIG. 7 An oblique view of a sealing body with a lead wire connected thereto.

FIG. 7 is an oblique view of the sealing body 300B with the internal lead wire 210B connected thereto. In FIG. 7, a region inward from the first aperture 326 of the gasket corresponds to the lead holding portion 324. The lead holding portion 324 is provided with two pipe portions 328a and 328b each serving as the securing portion. The pipe portions 328a and 328b are arranged facing each other across the second aperture 327.

The internal lead wire 210B is inserted through the pipe portions 328a and 328b. The internal lead wire 210B is thereby secured to the lead holding portion 324, and the internal lead wire 210B is securely attached to the gasket. In a region between the pipe portions 328a and 328b, the center region 312B of the sealing plate is exposed through the second aperture 327, where the internal lead wire 210B and the sealing plate are electrically connected to each other.

The pipe portions 328a and 328b may be, for example, a molded product constituting a clip system by snap fit. In this case, parts can be easily assembled into a pipe shape.

Note that, in order to securely attach the internal lead wire 210B to the gasket, the securing portion shaped like a pipe is not necessarily formed. For example, the securing portion may not be formed on the side of the internal lead wire 210B facing the electrode body 200B. The securing portion is preferably present in the space between the internal lead wire 210B and the sealing plate, at least on the upstream side of the internal lead wire 210B extending along the plane direction of the sealing plate. In this case, even when the sealing plate is deformed due to an increase in internal pressure in the battery, and the center region 312B moves upward, the deformation of the lead wire in the upward direction is restricted by the lead securing portion 324. This, as a result, makes it possible to shut down the current in the event where the internal pressure in the battery increases. Here, the securing portion (pipe portion) may not be necessarily provided two or more in number, and may be one in number.

However, a configuration in which two pipe portions 328a and 328b are provided (see FIG. 7) is preferable because the lead wire can be more securely attached to the gasket (lead holding portion).

Figure 8:
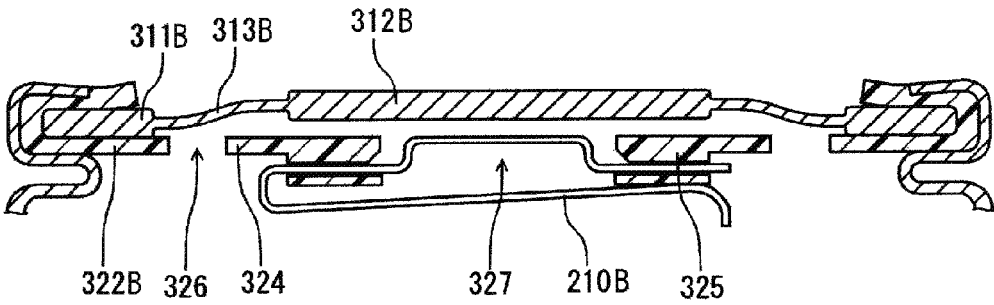
FIG. 8 A cross-sectional view showing a state of the sealing body and its vicinity when the internal pressure rises, in the battery.
Figure 9:
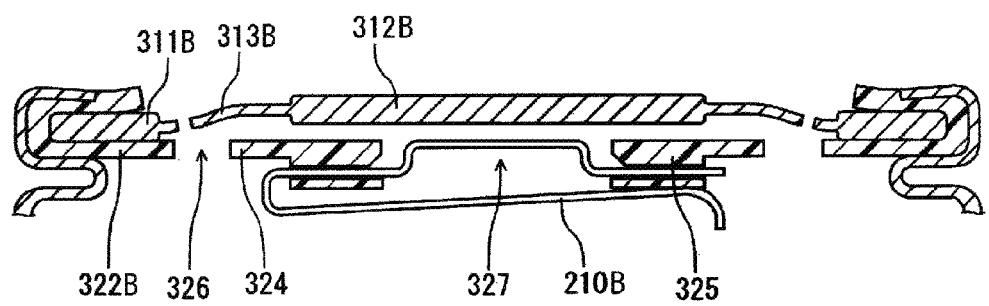
FIG. 9 A cross-sectional view showing another state of the sealing body and its vicinity when the internal pressure rises, in the battery.

FIGS. 8 and 9 are diagrams explaining how the battery 10B of the present embodiment behaves when the internal pressure rises, with reference to a cross-section of the sealing body 300B including the lead-holding portion 324, and a vicinity thereof.

When the internal pressure of the battery can 100B increases, a pressure toward the outside is applied to the sealing body 300B. This forces the sealing plate 310B outward through the first aperture 326. However, the deformation of the internal lead wire 210B following the deformation of the sealing plate 310B is suppressed, since the internal lead wire 210B is secured by the lead holding portion 324. When the internal pressure exceeds a predetermined value, the sealing plate 310B is disjoined from the internal lead wire 210B, and the center region 312B of the sealing plate 310B floats up from the lead holding portion 324 and the internal lead wire 210B. As a result, electric connection between the sealing plate 310B and the internal lead wire 210B is broken, shutting down the current flowing in the battery 10B (FIG. 8).

In FIG. 8, in the case where the internal pressure of the battery can 100B does not drop after the current is shut down, the stress due to tension is concentrated, for example, on the boundary between the peripheral portion 311B and the thin-walled portion 313B, causing a break to occur from the boundary. As a result, the internal pressure of the battery can 100B is released, and the safety of the battery 10B can be ensured (FIG. 9).

The battery can may be made of any material. Examples of the material include iron and/or an iron alloy (including stainless steel), copper, aluminum, and an aluminum alloy (including an alloy containing a trace amount of other metals, such as manganese and copper). The first busbar and the second busbar also made of any material, examples of which are as those of the battery can.

The gasket may be made of any material. Examples of the material include polypropylene (PP), polyphenylene sulfide (PPS), polyethylene (PE), polybutylene terephthalate (PBT), perfluoroalkoxyalkane (PFA), polytetrafluoroethylene (PTFE), and polyamide (PA).

The lead securing portion may be made of any material, examples of which are as those of the gasket.

Next, an illustrative description will be given of a configuration of the electrode body 200A (or 200B), with a lithium ion secondary battery taken as an example.

The cylindrical electrode body 200A (or 200B) is of a wound type, and is formed by spirally winding a positive electrode and a negative electrode with a separator interposed therebetween. To one of the positive and negative electrodes, an internal lead wire 210A (or 210B) is connected. The internal lead wire 210A (or 210B) is connected to the inner surface of the center region 312A (or 312B) of the sealing plate 310A (or 310B) by welding or the like. To the other one of the positive and negative electrodes, another internal lead wire is connected. The another internal lead wire is connected to the inner surface of the battery can 100A (or 100B) by welding or the like.

(Negative Electrode)

The negative electrode has a belt-like negative electrode current collector and a negative electrode active material layer formed on both sides of the negative electrode current collector. The negative electrode current collector is, for example, a metal film, a metal foil, or the like. The material of the negative electrode current collector is preferably at least one selected from the group consisting of copper, nickel, titanium, alloys thereof, and stainless steel. The negative electrode current collector preferably has a thickness of, for example, 5 μm to 30 μm.

The negative electrode active material layer contains a negative electrode active material, and optionally contains a binder and an electrically conductive material. The negative electrode active material layer may be a deposition film formed by a gas phase method (e.g., vapor deposition). Examples of the negative electrode active material include Li metal, a metal or an alloy that electrochemically reacts with Li, a carbon material (e g graphite), a silicon alloy, a silicon oxide, and a metal oxide (e.g., lithium titanate). The negative electrode active material layer preferably has a thickness of, for example, 1 μm to 300 μm.

(Positive Electrode)

The positive electrode has a belt-like positive electrode current collector and a positive electrode active material layer formed on both sides of the positive electrode current collector. The positive electrode current collector is, for example, a metal film, a metal foil (stainless steel foil, aluminum foil, or aluminum alloy foil), or the like. The positive electrode current collector preferably has a thickness of, for example, 5 μm to 30 μm.

The positive electrode active material layer contains a positive electrode active material and a binder, and optionally contains an electrically conductive material. The positive electrode active material is not limited, but may be a lithium-containing composite oxide, such as $LiCoO_2$ or $LiNiO_2$. The positive electrode active material layer preferably has a thickness of, for example, 1 μm to 300 μm.

Examples of the conductive material contained in each active material layer include graphite and carbon black. The conductive material is contained in an amount of, for example, 0 to 20 parts by mass per 100 parts by mass of the active material. Examples of the binder contained in the active material layer include fluorocarbon resin, acrylic resin, and rubber particles. The binder is contained in an amount of, for example, 0.5 to 15 parts by mass per 100 parts by mass of the active material.

(Separator) The separator is preferably a microporous resin film or a nonwoven resin fabric. Examples of the material (resin) of the separator include polyolefin, polyamide, and polyamide imide. The separator has a thickness of, for example, 8 μm to 30 μm.

(Electrolyte)

The electrolyte may be a non-aqueous solvent in which a lithium salt is dissolved. Examples of the lithium salt include $LiClO_4$, $LiBF_4$, $LiPF_6$, $LiCF_3SO_3$, $LiCF_3CO_2$, and imide salts. Examples of the non-aqueous solvent include: cyclic carbonic esters, such as propylene carbonate, ethylene carbonate, and butylene carbonate; chain carbonic esters, such as diethyl carbonate, ethyl methyl carbonate, and dimethyl carbonate; and cyclic carboxylic acid esters, such as γ-butyrolactone and γ-valerolactone.

Although a description is given above with a lithium ion secondary battery taken as an example, the present invention is applicable to a battery including a battery can which is sealed with a sealing body, regardless of whether the battery is a primary or secondary battery.

INDUSTRIAL APPLICABILITY

The battery according to the present invention is suitable for an application that requires a high energy density, and is suitable, for example, as a power source for portable devices, hybrid vehicles, electric vehicles, and the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

20: battery module
10A, 10B: battery
100A, 100B: battery can
110A, 110B: open rim
110S: tapered region
110T: end surface
111: projection
120A, 120B: cylindrical portion
130A, 130B: bottom wall
140: constricted portion
200A, 200B: electrode body
210A, 210B: internal lead wire
300A, 300B: sealing body
300X: first principal surface
300Y: second principal surface
300Z: side surface
310A, 310B: sealing plate
311A, 311B: peripheral portion
311T: end surface
3111: recessed groove
312A, 312B: center region
313A, 313B: thin-walled portion
320A, 320B: gasket
321A, 321B: outer ring portion
322A, 322B: inner ring portion
323A, 323B: side wall portion
3231: recessed portion
324: lead holding portion
325: securing portion
326: first aperture
327: second aperture
328a, 328b: pipe portion
600: busbar (first busbar)
600X: third principal surface
600Y: fourth principal surface
601: first portion -continued 602: second portion
603: through-hole
700: second busbar
701: third portion
703: second through-hole
800: insulating member
803: third through-hole

The invention claimed is:

1. A battery, comprising:

a battery can including a cylindrical portion, a bottom wall closing one end of the cylindrical portion, and an open rim continuing to an other end of the cylindrical portion;

an electrode body housed in the cylindrical portion; and a sealing body fixed to the open rim so as to seal an opening defined by the open rim, the sealing body having a first principal surface facing an interior of the battery can, a second principal surface opposite to the first principal surface, and a side surface connecting the first principal surface with the second principal surface, wherein the sealing body has a sealing plate that includes a peripheral portion and a center region, and a gasket disposed at a the peripheral portion, the sealing plate further including a thin-walled portion provided in a region between the peripheral portion and the center region, the thin-walled portion having a thickness which is thinner than a thickness of the peripheral portion and a thickness of the center region, the gasket has an inner ring portion disposed on the peripheral portion on a side facing the electrode body, an outer ring portion disposed on the peripheral portion on a side opposite the side facing the electrode body, a side wall portion covering an end surface of the peripheral portion, and a lead holding portion disposed continuously with the inner ring portion and disposed below the center region, wherein a first aperture is provided between the inner ring portion and the lead holding portion so as to correspond to the thin-walled portion so as to be directly below the thin-walled portion, and a second aperture is provided at the center of the lead holding portion, an outer surface of the cylindrical portion has a groove which extends in a peripheral direction, and an inner surface of the cylindrical portion which corresponds to the groove protrudes inwardly, the groove being located between the gasket and the electrode body, an internal lead wire is extended from the electrode body, and the internal lead wire is connected to the sealing plate through the second aperture, the internal lead wire is securely attached to the lead holding portion, and the internal lead wire has a joint portion which is joined to the sealing plate, the joint portion overlaps the second aperture, the lead holding portion is located nearer an outer peripheral portion of the inner ring portion than the second aperture in a radius direction of the battery can, when viewed from an axial direction of the battery can, the lead holding portion is located radially inward of the first aperture, a dimension of the first aperture is smaller in a radial direction than the thin-walled portion, the gasket has an inner ring portion disposed on the peripheral portion on a side facing the electrode body, an outer ring portion disposed on the peripheral portion on a side opposite the side facing the electrode body, a side wall portion covering an end surface of the peripheral portion, and a lead holding portion disposed continuously with the inner ring portion so as to face the electrode body, the internal lead wire is securely attached to the gasket via the lead holding portion, the lead holding portion has a pipe portion through which the internal lead wire is inserted along the plane direction of the sealing plate, a plurality of the pipe portions are provided, the pipe portions being arranged facing each other across the second aperture, and the internal lead wire is inserted into each of the pipe portions.

2. The battery according to claim 1, wherein the lead holding portion is present between the internal lead wire and the sealing plate, on the upper side of the internal lead wire extending along a plane direction of the sealing plate.

3. The battery according to claim 1, wherein the lead holding portion forms the pipe portion by a snap-fit mechanism.

4. The battery according to claim 1, wherein the inner ring portion, the outer ring portion, the side wall portion, and the lead holding portion are integrally molded together into the gasket.

5. A battery module, comprising:

a plurality of the batteries according to claim 1, and a busbar electrically connecting the plurality of batteries, the busbar having a plurality of through-holes fitted with the batteries, wherein the open rim of each of the batteries fitted into the through-holes is at least partially in contact with the busbar, the open rim and the busbar are electrically connected to each other, and the sealing body and the busbar are electrically insulated from each other.

6. The battery module according to claim 5, wherein the busbar has a first portion covering at least part of the side surface of the sealing body, with the open rim of the battery can between the first portion and the side surface, the first portion has a first end and a second end in the axial direction, the second end is located nearer the bottom wall than the first end in the axial direction, and an interface between the open rim and the cylindrical portion is nearer the bottom wall than the second end in the axial direction.

7. The battery module according to claim 5, wherein the busbar has a second portion covering at least part of an outer periphery of the second principal surface of the sealing body.

* * * * *